United States Patent [19]

Burton et al.

[11] B 3,922,084

[45] Nov. 25, 1975

[54] CONTROLLED DOCUMENT RECORDING SYSTEM

[75] Inventors: John S. Burton, Los Angeles; Ronald L. Whitney, San Fernando, both of Calif.

[73] Assignee: Terminal Data Corporation, Woodland Hills, Calif.

[22] Filed: Jan. 2, 1974

[21] Appl. No.: 430,140

[44] Published under the Trial Voluntary Protest Program on January 28, 1975 as document no. B 430,140.

[52] U.S. Cl. ........................ 355/41; 355/50; 355/64

[51] Int. Cl.² ........................ G03B 27/52

[58] Field of Search ............ 355/14, 40, 41, 43, 50, 355/64

[56] References Cited

UNITED STATES PATENTS

| | | | |
|---|---|---|---|
| 3,334,539 | 8/1967 | Kleist et al. | 355/64 X |
| 3,493,301 | 2/1970 | Sable et al. | 355/64 |
| 3,586,437 | 6/1971 | Dietz et al. | 355/64 X |
| 3,602,589 | 8/1971 | Dietz | 355/64 X |
| 3,689,149 | 9/1972 | Livingood | 355/64 X |

*Primary Examiner*—Richard A. Wintercorn
*Attorney, Agent, or Firm*—Harry R. Lubcke

[57] ABSTRACT

A recording system for making photographic microcopies of documents in which control documents interspersed therewith have particular preselected code markings for the control of the transport-photographing system. The control documents give a unique response to specialized illumination directed upon the path of the documents through the system. This response is discerned by sensors and introduced to electronic logic which produces signals for the control of the system in handling and photographing the documents. A "clock" marking is positioned at an extremity of the control document, and unless a signal from this mark is present the logic will not give an output. A differential comparison may be made to prevent spurious responses.

15 Claims, 4 Drawing Figures

CONTROLLED DOCUMENT RECORDING SYSTEM

BACKGROUND OF THE INVENTION

This invention relates to the control of a machine by means of coded indicia upon material handled by the machine.

The prior art has included various devices in which coded material is employed to control the performance of a machine.

One of these employs cards which are passed through a reading station at the same time as documents are passed through a machine. The cards carry the commands.

Another employs various colors, such as ten, to convey information from a tape upon which the colors in dot or readable numeral form are to be found to logic apparatus through the use of plural photocells having optical color filters.

Another employs phosphorescent spots that are excited by ultraviolet illumination and scanned by a rotating mirror drum. The electrical response is gated in time so that spurious fluorescent responses will not obscure the desired dot information. A large plurality of photoelectric cells are employed.

Another employs only a single photo-responsive device, before which coded dots, etc., pass, and a sequential pulse train is obtained in the electrical circuit.

Another, for selective Xerographic printing employs a plurality of photoresponsive elements to take inputs from plural side-by-side indicia on separate cards.

Another, for automatically determining the cost of a retail product from a label having a code in plural areas of plural optical properties is read by an ultra-violet flash of illumination and a corresponding electrical output is obtained in plural electrical channels according to the information.

BRIEF SUMMARY OF THE INVENTION

Interleaved control documents control the functioning of a recording system for making photographic microcopies.

The control documents are approximately the same size or larger, typically longer, than the documents that are to be photographed. A clock mark is placed upon one extremity of the control documents. A sensor is responsive thereto, and without such a response the logic does not allow any control to modify the otherwise programmed performance of the machine.

Plural marks are additionally positioned upon the control document within the area occupied by the documents that are to be photographed. These initiate commands through additional sensors to control the transport and/or the photographing elements of the system.

It will be appreciated that it is difficult to correct a control command when the medium is any kind of continuous tape; and that any separate control medium, tape or cards, can lose synchronism with the documents being recorded.

The arrangement of this invention has the advantages that preprogramming the sequence of photographing the documents can be accomplished away from the apparatus, thus saving valuable machine time; that any errors in inserting the control documents can be corrected by acting only upon the control document at fault without regard to others; that there is no possibility of the control and the documents to be photographed losing synchronism; that there is only one stack of documents to handle; and that the control documents can be used over and over again almost indefinitely.

Structurally, only a simple optical system, preferably an ultraviolet light source, fluorescent ink or paint on the control documents to change the ultra-violet energy to visible energy, sensors to detect such energy, and logic to interpret the commands, are all that are required.

Additionally, the sensors may be arranged to be sensitive to only a part of the visible spectrum, as the orange-yellow. This can be accomplished by using optical filters in the optical path adjacent to the sensors. This arrangement removes spurious responses in the blue-white spectral region that could otherwise interfere, due to fluorescent materials included in bond paper to enhance the whiteness thereof.

DESCRIPTION OF THE PREFERRED EMBODIMENTS

While the description herein is complete, this control document system is particularly useful with the "Two-sided Document Recorder" disclosed in a patent application by the same inventors, Ser. No. 405,354, filed Oct. 11, 1973.

Figure 1:
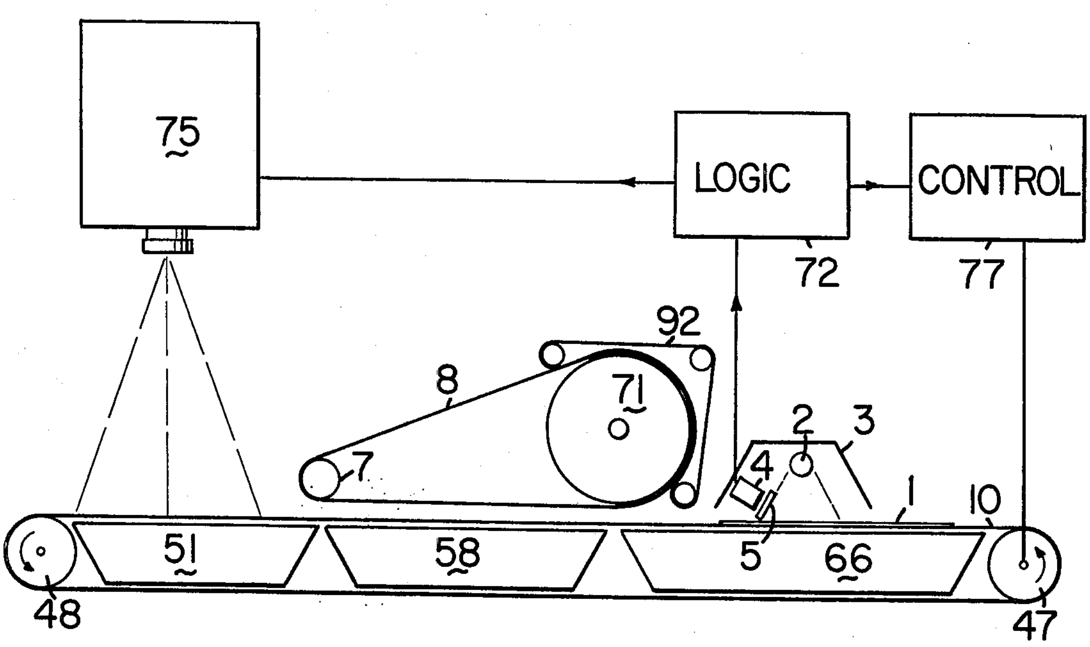
FIG. 1 shows the illumination and response elements of the system as related to the transport path and other elements, such as the camera.

In FIG. 1, numeral 10 represents a plurality of transversely aligned belts suited to convey control document 1 from right to left. Documents to be photographed are similarly successively handled. Plenum 66 is constantly evacuated by a vacuum pump, not shown, and the vacuum created holds the document to the belts. Plenum 58 similarly presents a vacuum when belts 10 are progressing from right to left, but air pressure when belts 10 are progressing from left to right and the document to be photographed is turned over, as by attaching to belt 8 and passing around large roller 71. Belts 92 retain the document upon roller 71.

Turning over the document when the machine has been set not to turn the documents over, and vice versa, is one type of command that can be programmed-in by a control document that passes through the apparatus just in advance of the document to be turned over. Other commands typically have to do with the control of the recording camera.

Ultra-violet lamp 2 extends transversely across belts 10 and may typically be the G.E. F15T8/BLB black light with integral filter, suited to emit energy in the 350 millimicron region of the spectrum. This illuminates all documents as they pass through the machine, performing a significant function in combination with a control document. Reflector 3 serves to direct some of the light to the document and also to protect the operator.

Sensors 4 are located near the path of the documents and are inclined at an angle to directly pick up the illumination, now in the visual region of the spectrum because of wavelength transformation by the fluorescent marks upon the control document of FIG. 2.

The sensors may be any type suitable for giving an essentially maximum response in the yellow-orange portion of the visible spectrum. The Clairex cadmium selenide photo-resistors are suitable, with an appropriate filter in front of each, such as a Wratten No. 15, the latter identified by 5.

Figures 2A, 2B:
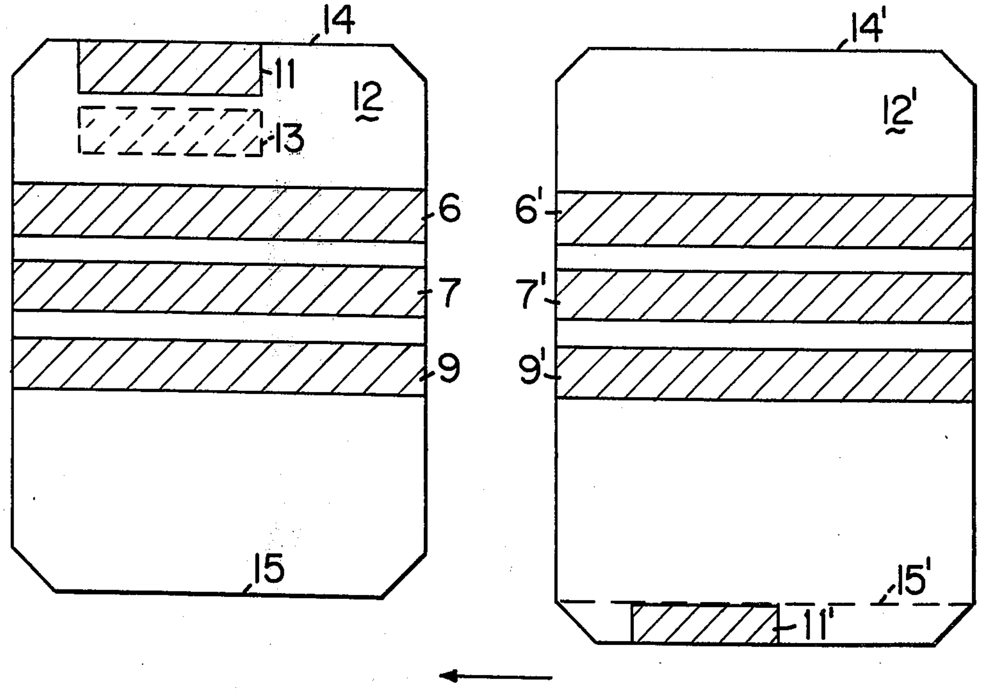
**FIG. 2*a*** shows a typical control document of the same size as that of the other documents.
**FIG. 2*b*** shows a typical oversize control document.

Typically there are five sensors spaced transversely across the document path of the machine, as indicated by the positions of the fluorescent ink marks, typically stripes, 6, 7, 9, 11 & 13 on control document 12 in FIG. 2*a*. In the alternate form of control document 12' of FIG. 2*b*, the positions of the sensors for stripes 6', 7', & 9' are the same as for control document 12, but the position for stripe 11' has been shifted to the far opposite end of the document and only one sensor need be employed.

The top edges 14 or 14' of the control documents are the guiding edges. This edge is in contact with a guiding fence at a loading station of the machine, or it is given a fixed transverse position by an automatic feeder. Both of these known items are not shown. However, the positions of the several stripes, as 6, 7, 9, 11 & 13, are uniquely determined for all control documents of a given type so that corresponding sensors can be aligned with each stripe.

FIG. 2*a* shows a typical control document that is the same size as the typical ordinary document, as 8½ by 11 inches. This size can be conveniently handled with usual documents in an automatic feeder machine. Either clock stripe 11, or an equivalent stripe 13, is present on each control document, but both are not present at the same time, since the "background" of the paper or equivalent surface of the control document is required to give a "zero" reference against which the response of the ink stripe constitutes a strong and valid identification of the control document.

In FIG. 2*b* the extra-length control document 12', the 11 inch extent of a typical ordinary document is indicated by dotted line 15'. Clock strip 11' is placed beyond line 15'. In this position the corresponding sensor is beyond the influence of reflections of light from ordinary documents and so a differential background reference is not required.

Each clock stripe is of shorter length laterally across the control document than are the other stripes, which latter extend all across the page. Each clock stripe is positioned forwardly with respect to the center of the control document. In FIG. 2 the direction of travel of all documents upon transport belt 10 is shown by the arrow. This configuration makes certain that the other stripes, 6, 7 & 9, will surely be influencing the appropriate sensor when the presence of the clock stripe gives the command for the logic to "read."

All of the stripes may be executed with the same type of fluorescent ink; one capable of emitting a yellow-orange visible light as a result of ultra-violet light excitation, such as the ARC-YELLOW screen ink of the Dayglo Company. This may be silk screened onto the control documents, or otherwise applied.

The control documents themselves may be made of a number of materials, including thick paper, thin cardboard, a white plastic known as Tyvec, and the polyester sheet known as Mylar. A thickness of 0.005 to 0.007 inch is suitable.

The control significance of the combination of marks may be arranged to suit a range of requirements. Certain of these may constitute commands to be primarily executed upon the transport and camera mechanisms, such as "photograph both sides of the following document" amid a series of documents for which the external control of the apparatus has been set to photograph only one side, and vice versa.

Other combinations of marks may constitute commands to be executed by the photographic element of the apparatus, such as "finish microfiche", "skip frame", "terminate a row or a column", or "title the microfiche."

Three marks may constitute a 1–2–4 code, in which the base 2 is successively raised to the zero power, the first power and the second power.

Figure 3:
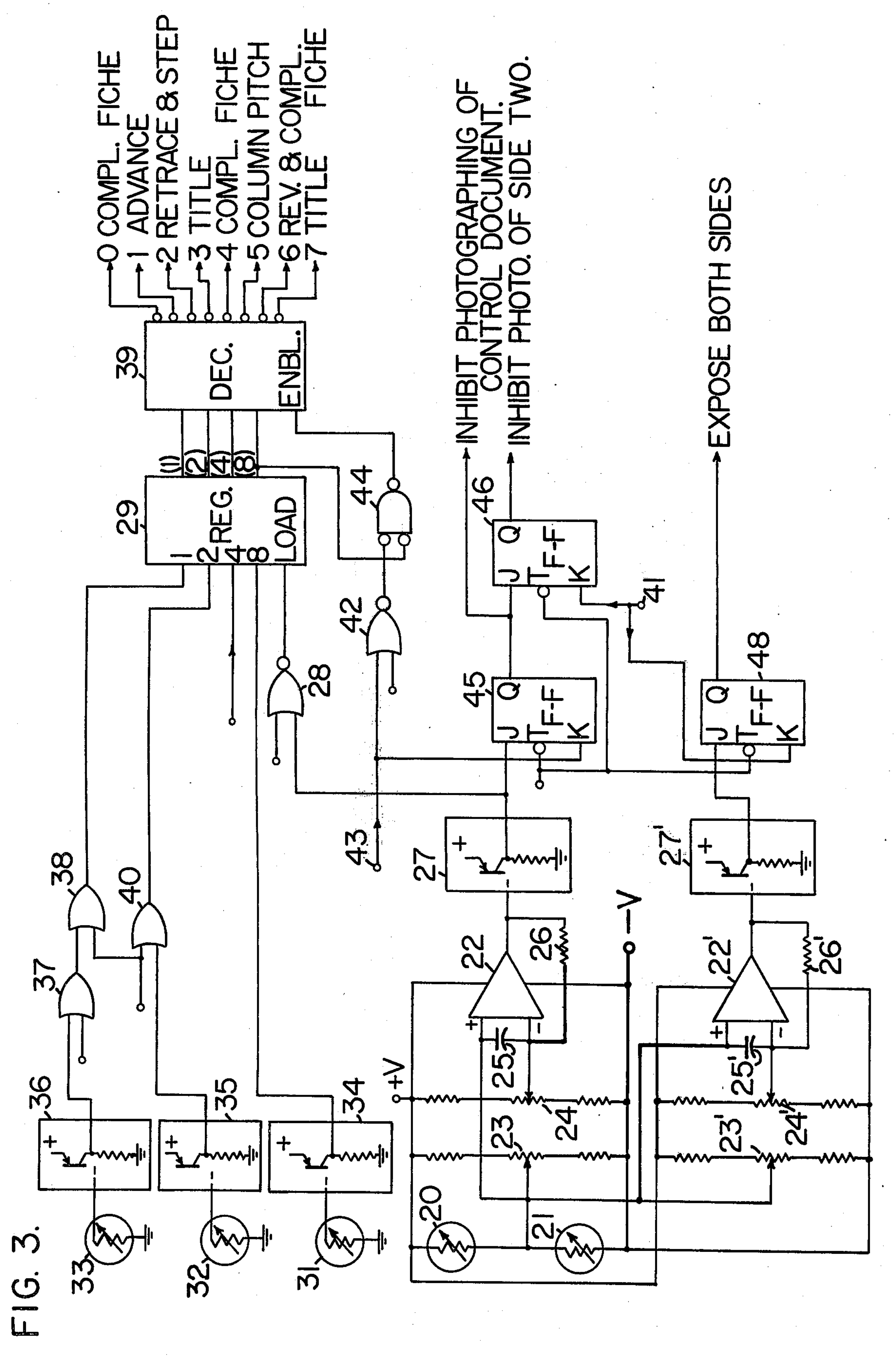
FIG. 3 shows the sensors and the connected electronic logic apparatus.

The electronic logic diagram of FIG. 3 is complete in itself. However, the commands it generates can have significance only with respect to further apparatus to be controlled. In this instance such apparatus includes document transport and photographing devices. The logic herein thus has outputs which feed further logic associated with these devices. Such may be found in the patent application for a two-sided document recorder by the same inventors, Ser. No. 405,354, filed Oct. 11, 1973; also camera control logic such as found in the patent to J. Burton, et al., U.S. Pat. No. 3,601,487, issued Aug. 24, 1971, or Roberts, et al., U.S. Pat. No. 3,767,302, issued Oct. 23, 1973.

An example of control by means of the control documents of this invention is the creation of a complete-fiche signal. The overall recorder apparatus may be set for the completion of a fiche after 16 rows according to a usual format. However, the text of the documents to be recorded may only require seven rows in a specific case. By inserting a control document coded to originate this signal after the last document in the seventh row, the camera logic is commanded to complete the fiche automatically for this specific case. The operator is not required to readjust the overall recorder apparatus in any way. This results in rapidity of processing, with consequent savings in labor and full utilization of the machine.

Similarly, photography on only one side of a document can be arranged amongst a group of documents that are to be photographed on both sides.

The control documents are handled in the same manner in the transport mechanism as any other document, but they contain commands to not be photographed, since this would serve no purpose.

The presence of a control document is sensed by a reflection from the "clock" stripe 11 or 11' in FIG. 2 into photo-resistor 20. The latter device in FIG. 3 is one of the same collectively labeled 4 in FIG. 1. This enables the rest of the logic to respond to commands from other stripes only when the clock stripe is sensed, thus removing spurious responses from the text of ordinary documents.

For stripe 11 in FIG. 2*a* photo-resistor 20 senses the clock stripe and photo-resistor 21 senses the response from the ordinary surface of the control document or usual document in a path adjacent to the clock stripe. When a control document is present the response of the special ink is relatively very great over the response of the plain document surface. Thus, a large differential input enters differential amplifier 22 and an output is obtained therefrom. However, when an ordinary document is present at the illumination-sensing station shown in FIG. 1 the response from both 20 and 21 photo-resistors is either exactly or closely the same, since both sense the same surface. The differential input to amplifier 22 is thus small or non-existent and no output is obtained therefrom.

The two-resistor and potentiometer arrangement 23 sets the response of photo-resistor 20 to suit the upper input of differential amplifier 22, and the two-resistor and potentiometer arrangement 24 does the same for the lower input to the differential amplifier. By understandable adjustment of either or both of these potentiometers the differential response to a non-control document can be made zero or nearly zero. Capacitor 25 is of relatively small capacitance and serves to eliminate spurious high frequency electrical noise. It is connected across the input of the differential amplifier. Resistor 26 is connected from input to output of amplifier 22 and controls the total loop gain. This amplifier may be an Intersil type 8007C.

The output thereof passes into switching amplifier 27, which may be of the ICL 8007CTV type. It provides an essentially "on" or "off" output of either 3 volts or 0.5 volts.

This output passes through NOR gate 28 to the "load" input of latch operated holding register 29. This is a 74163 integrated circuit, which is basically a BCD counter, but is employed here to store the data derived from the stripes upon the control documents.

The second input to gate 28 is employed to actuate the logic of FIG. 3 when the whole apparatus is in the Manual mode; i.e., when the operator must push a button to actuate the significant operations of the whole apparatus.

Photo-resistors 31, 32, 33 are further elements of the collectively labeled sensor 4 in FIG. 1, and are positioned so as to be aligned with control document stripes 9, 7, 6, or 9', 7', 6', respectively. The electrical outputs of these photo-resistors, or equivalent photo-sensitive devices, are individually amplified by switching type amplifiers 34, 35, 36, respectively. These are the same type as previously considered amplifier 27; the final stage of each being fragmentarily shown as a collector-output transistor stage.

The output of amplifier 36, conveying the output sensed by photoresistor 33, enters one input terminal of each of OR gates 37 and 38. The other terminal of each of these gates is connected to Manual switches, not shown, for actuation of the logic of FIG. 3 insofar as necessary when the whole apparatus is controlled manually by an operator.

For the automatic mode of this control document invention the output of amplifier 36 passes through gates 37 and 38 whenever present and without modification. It then enters input terminal 1 of register 29 for temporary storage until this information is to be processed by decoder 39. This is a BCD (binary coded decimal) to Decimal decoder, and may be of the 7442 type.

In a similar manner the output of photo-resistor 32 is amplified by amplifier 35, passes through OR gate 40 and enters input terminal 2 of register 29.

In a further similar manner the output of photo-resistor 31 is amplified by amplifier 34 and passes directly to input terminal 8 of register 29.

In a typical application of the controlled document recording system of this invention the recording may be on microfiche. These card films have numerous rows and columns of reduced images of pages of documents, as is known and as treated more fully in the two patents that have been previously referred-to. The pattern of stripes on the control documents of this invention advantageously relate to the make-up, format, etc., of the microfiche. Among other parameters, the placement of successive images on the fiche may be along a row, or in a column. Accordingly, the commands to place the film in the camera for the next exposure, or to complete a fiche, will require different motions depending upon the format in use.

For these reasons the input to terminal 4 of holding register 29 receives an input from an OR gate associated with the control panel of the over-all apparatus (not shown), which is "1", or true, or a positive potential of the order of 3.2 to 3.8 volts for the row mode of fiche generation, and a "0", or false, or zero potential for a column mode of fiche generation. This enables decoder 39 to decode the proper command for row or column.

For example, if in the column mode an operator puts a control document in the stack of documents to be recorded to effect an "advance" command, this is a valid command only if the apparatus is in the row mode. However, since the apparatus is in the column mode decoder 39 issues a column "advance" command.

Typical control document functions are given in Table I.

TABLE I

| CONTROL DOCUMENT COMMAND 31 | 32 | 33 | FICHE FORMAT COL. | ROW | DECODER OUTPUT | CONTROL FUNCTION |
|---|---|---|---|---|---|---|
| 0 | 0 | 0 | X | | 0 | Complete fiche |
| 0 | 0 | 0 | | X | 4 | Complete fiche |
| 0 | 0 | 1 | X | | 1 | Advance command |
| 0 | 0 | 1 | | X | 5 | Column pitch com. |
| 0 | 1 | 0 | X | | 2 | Retrace & step |
| 0 | 1 | 0 | | X | 6 | Reverse & complete fiche |
| 0 | 1 | 1 | X | | 3 | Title command |
| 0 | 1 | 1 | | X | 7 | Title command |

In Table I the first three columns give the response from the trio of photo-sensors, typically photo-resistors, 31, 32, 33. A "O" denotes no stripe on the control document and a "1" denotes a stripe is present in the path of the sensor indicated. In the example chosen sensor 31 is tabulated as having all zero values. This signifies an absence of a command stripe in this path for all of the control documents listed. For further commands, such as might be peculiar to a particular installation where cooperation between the recorder and other devices might be required, this path may be used and will influence the logic accordingly.

The fourth and fifth columns in the table indicate whether the fiche format is column or row, as entered into this logic by a "0" or a "1" into input terminal 4 of register 29.

The sixth column in the table indicates which output connection of decoder 39 will have an output signal, these being numbered 0 to 7.

The seventh column in the table identifies the control function accomplished by further logic and/or servo and actuator systems in the control of the fiche camera in this example. Alternatively, other or additional functions may be controlled, such as to alter the path of the next document after the control document from one-side passage through the transport to two-side passage, and vice versa. In the example of the logic of FIG. 3 these commands are to be executed by the logic control unit of a microfiche camera such as those disclosed in previously mentioned U.S. Pat. Nos. 3,601,487 or 3,767,302. The control functions of the table are reproduced at the outputs of decoder 39 in FIG. 3.

Returning to FIG. 3, the upper input to NOR gate 42 is derived from logic associated with the transport mechanism such as handles documents and control documents according to this invention. Specifically, terminal 43 is connected to state counter 130 of FIG. 7 of the copending patent application by the same inventors, Ser. No. 405,354, previously mentioned. This has to do with manipulation of side 1 of all documents. At the time that a document is sensed as at the photographing position a signal appears from the state counter at terminal 43. This causes the output gate 42 to go "lo".

This output goes to the upper input of negative AND gate 44. As long as a "lo" input is also obtained from weighted bits output (8) of counter-register 29, both inputs are then "lo" and the output is also "lo." This enters the enabling input of BCD to Decimal decoder 39 and allows an output therefrom. This enabling input triggers-out the output from the decoder that the state of register 29 supplied as an input thereto.

The second input to NOR gate 42 is active only when the control of the document machine is switched to Manual operation and the automatic functioning accomplished by the control documents is then inhibited.

The state counter input from terminal 43 also enters the "K" input of Flip-flop 45, resetting it, and allowing the electronics to interrogate the next document. This flip-flop is provided with a constantly operating clock at its "T" terminal, through an inverting connection. This may be of the order of 16 kilohertz and allows activation of this flip-flop as soon as an appropriate input is provided.

Such an input comes from either of sensors 20 or 21, through amplifiers 22 and 27. It enters the "J" input of the flip-flop.

The "Q" output of this flip-flop constitutes a signal to the camera control to "inhibit photographing of control document." This is an essential function. Otherwise the fiche would have a frame consisting of the control document each time one was used. This would be a confusing waste to the viewer when the fiche was subsequently used for reading the text of the documents sought to be recorded.

The "Q" output of flip-flop 45 enters the "J" input of a second flip-flop 46. The "Q" output of this flip-flop acts in the same manner as above to "inhibit photographing of side two." This flip-flop is similarly supplied with clock pulses at an inverted "T" terminal. It is reset at input "K" terminal by an output from state counter 171, which has to do with manipulation of side two of documents when these sides are to be photographed. The output from counter 171 enters FIG. 3 through terminal 41. As with state counter 130 previously mentioned, counter 171 is not reproduced in FIG. 3. It is shown in FIG. 8 of application Ser. No. 405,354, and is described therein.

In order to execute an "expose both sides" command by means of an appropriately striped control document when the machine as a whole has been programmed to exposed only one side, the apparatus in the middle row of FIG. 3 is duplicated in part in the lower row.

For normal clock marking, to enable any of the prior commands in further response to appropriate stripes under sensors 31, 32, 33, a clock stripe is placed on the control document to pass under sensor 20. Sensor 21 then views the background surface of the control document and a desired positive input is established at the input terminals of amplifier 22. This condition makes the negative input of amplifier 22′ go further negative and so no response is had from that apparatus.

When a control document is inserted to "expose both sides" the stripe is changed in position, to be under sensor 21, while sensor 20 takes the background view. This does not execute a change in potential that is effective in producing an output from amplifier 22, but it drives the negative terminal of amplifier 22′ positive and so does produce an output from that amplifier. Potentiometer circuits 23′ and 24′ adjust the differential input to amplifier 22′, capacitor 25′ is a high frequency spurious noise filter, and resistor 26′ is a feedback resistor; all as before for the corresponding non-primed numeral circuit elements.

This output passes through an amplifier 27′, as before. The output thereof is connected to the "J" terminal of flip-flop 48. This flip-flop is provided with an inverted clock at terminal "T" and is reset at terminal "K" from state counter 171 through a connection to terminal 41. When thus actuated the command to expose both sides of the succeeding document appears at the "Q" output terminal of flip-flop 48. This enables "expose side 2" of state counter 171, thus exposing side 2 as well as side 1.

The logic of FIG. 3 is generic as to the alternate embodiments of the control documents of either FIGS. 2*a* or 2*b*. For the control document of FIG. 2*a* sensors 20 and 21 are located to intercept illumination from stripes 11 or 13, respectively, at the top of the control document.

For the control document of FIG. 2*b* a similar arrangement may be used with sensor 20 positioned to track stripe 11′ and sensor 21 to view the surface of the control document just above the dotted line 15′.

Alternately, sensor 21 and differential amplifier 22 may be omitted. Sensor 20 then takes on the circuit and mode of operation of that of sensors 31, 32, 33 and their amplifiers 34, 35, 36. With the longer control document of FIG. 2*b* the sensor that views this portion does not view anything like a document when a longer control document is not present and differential discrimination is not required.

An alternate arrangement to separate control documents according to FIGS. 2*a* or 2*b* is to mark an appropriate regular document with an invisible ultra-violet sensitive — visible light-emissive ink in the path that is required, such as 13. A suitable ink is Ultra Violet Products Co. number A 947. Since this ink does not fluoresce as strongly as the visible type of ink, differential amplifiers 22 and 22′ detect the presence of the stripe and decodes the command.

The command typically executed by this alternate is photography of both sides when the machine is in the single-sided mode, or photography of one side when the machine is in the two-sided mode.

It will be recognized that the locations and nature of the marks or stripes on the control documents and the size of the same with respect to the particular size of the documents handled may be subject to variation under this invention. Also, any or all sensors may be arranged to occupy more than one position transversely of the path of the documents along the generic position 4 shown in FIG. 1.

We claim:

1. A document photography system comprising;

a. means to transport (10) and photograph (75) documents (1), b. means to illuminate (2) said documents while being transported, c. control documents (12) having selected marks (6,7,9,11) at selected positions thereon, d. means electrically responsive to illumination (4) returned from said marks, e. control means (77) operatively connected to said means to transport and photograph documents, and f. logic means (72) connected to said means electrically responsive to illumination, and to said control means, to control said means to transport and photograph documents according to commands inherent in said selected marks;

said control documents being dimensioned such as to be selectively intermixable with documents to be photographed.

2. The document photography system of claim 1, in which;

a. one of said selected marks is a clock mark (11) having a selected location on each said control document to influence a specific one (20) of said means electrically responsive to illumination to illumination that is returned from said clock mark.

3. The document photography system of claim 1, in which;

a. said marks are parallel stripes.

4. The document photography system of claim 1, in which;

a. said means to illuminate said documents is an ultra-violet illumination-emitting means.

5. The document photography system of claim 4, in which;

a. said marks are constituted to accept ultra-violet illumination and to emit visible illumination as a consequence of the ultra-violet illumination.

6. The document photography system of claim 1, in which;

a. said means electrically responsive to illumination is responsive significantly only in the yellow-orange portion of the visible light spectrum.

7. The document photography system of claim 2, in which;

a. said logic means (72) connected to said means electrically responsive to illumination is constituted to remain inactive unless a said clock mark is present upon said control document.

8. The document photography system of claim 2, in which;

a. said clock mark (11) is at the top of each said control document.

9. The document photography system of claim 2, which additionally includes;

a. an additional means (21) electrically responsive to illumination returned from the surface of said control document, and b. differential electronic means (22) connected to both that means (20) electrically responsive to illumination returned from said clock mark (11), and also connected to said additional means (21), whereby an output from said differential electronic means (22) is obtained only when there is a significant difference in the illumination returned from said clock mark and said surface, thus signifying the presence of said clock mark.

10. The document photography system of claim 2, in which said logic means (72) includes;

a. a register (29) connected to said means electrically responsive to illumination (4) to store the electrical response thereof to illumination from said marks (6,7,9), and b. a decoder (39) connected to said register to convert the pattern of response of said means electrically responsive to illumination (4)

to electrical said commands upon separate conductors for the control of said document photography system.

11. The document photography system of claim 1, in which;

a. each of said control documents is larger than the documents to be photographed.

12. The document photography system of claim 2, in which;

a. the larger part of each said control document carries a said clock mark.

13. The document photography system of claim 11, in which;

a. said larger part of each said control document is a greater length than the length of said documents to be photographed.

14. The document photography system of claim 1, in which;

a. said control documents (12) are formed of documents (1) that are also to be photographed, b. by adding marks (11) to said documents to be photographed.

15. The document photography system of claim 14, in which;

a. said marks are formed of invisible fluorescent ink.

* * * * *